W. W. WILEY.
Grain Drill.
No. 53,072. Patented Mar. 6, 1866.
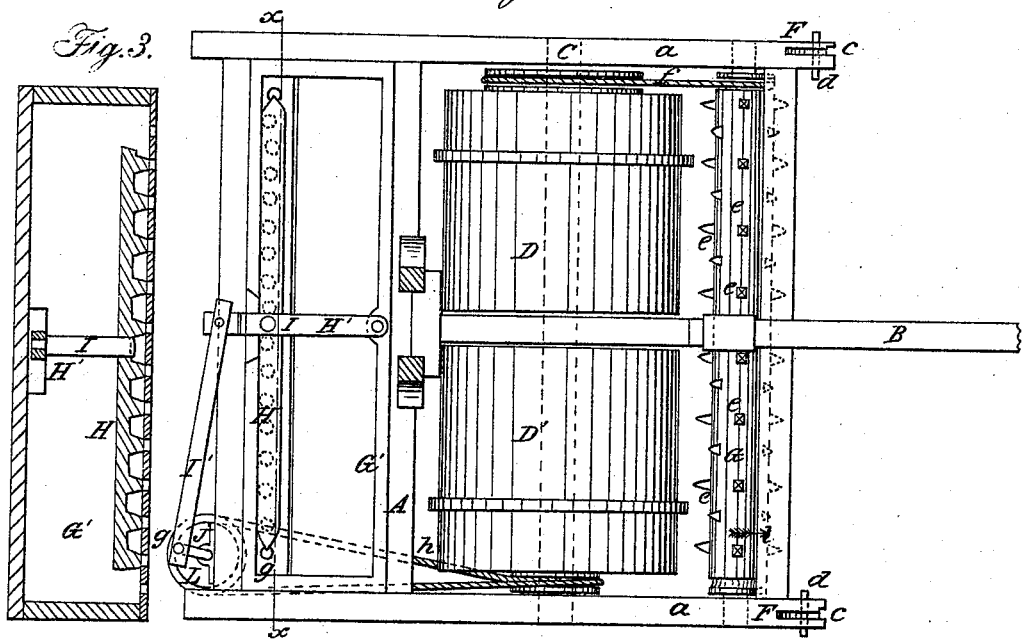
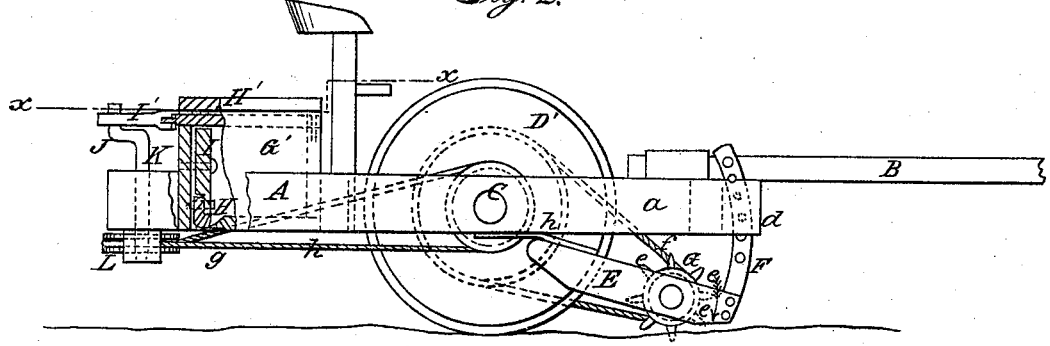
Witnesses:
Inventor:

UNITED STATES PATENT OFFICE.

W. W. WILEY, OF EDINA, MISSOURI.

IMPROVEMENT IN COMBINED SEEDING-MACHINE, ROLLER, AND HARROW.

Specification forming part of Letters Patent No. 53,072, dated March 6, 1866.

*To all whom it may concern:*

Be it known that I, W. W. WILEY, of Edina, in the county of Knox and State of Missouri, have invented a new and Improved Combination of a Roller, Harrow, and Seeding-Machine; and I do hereby declare that the following is a full, clear, and exact description thereof, which will enable those skilled in the art to make and use the same, reference being had to the accompanying drawings, forming part of this specification, in which—

Figure 1 is a plan or top view of my invention, the driver's seat and the lid or top of the seed-box being removed, as indicated by the line $x\ x$, Fig. 2; Fig. 2, a side view of the same with one end of the seed-box partially broken away; Fig. 3, a detached vertical section of the seed-box, taken in the line $y\ y$, Fig. 1.

Similar letters of reference indicate corresponding parts.

This invention consists in attaching a rotary harrow to a frame in which a roller is placed, and in such a manner that the harrow may be rotated from the roller and be capable of being adjusted higher or lower, as circumstances may require. A seed-distributing device is also placed on the frame and operated from the roller, all being constructed and arranged in such a manner that the several parts above mentioned will operate conjointly and in a perfect manner.

A represents a rectangular frame, having a draft-pole, B, attached to it, and a shaft, C, fitted transversely in it, on which two rollers, D D, are placed loosely and allowed to rotate freely. These rollers may be constructed of any proper diameter, and either of wood or metal, or both, and have bands upon them for marking off or furrowing.

To the under side of each side bar, $a$, of the frame A there is attached, by a hinge or joint, $b$, a bar, E. The front ends of these bars have plates F secured to them, which pass up through slots $c$ in the front ends of the side bars, $a\ a$, and may be secured at a higher or lower point therein by pins $d$ passing through any of a series of holes in the plates F. (See Fig. 2.)

The bars E E serve as bearings for the journals of a rotary harrow, G, which is constructed of a cylinder having teeth $e$ driven into its periphery, as shown clearly in Figs. 1 and 2. This harrow is rotated as the machine is drawn along from one of the rollers D by means of a belt or chain, $f$, grooved pulleys being formed at one end of the roller and harrow for said belt or chain to work around.

The direction in which the harrow is rotated is indicated by arrow 1 in Fig. 2, and said harrow may be adjusted higher or lower, so that its teeth $e$ may penetrate into the earth a greater or less distance, by adjusting the plates F higher or lower in the side bars, $a\ a$, of the frame A, as previously described.

On the frame A, directly behind the rollers D D', there is placed a seed-box, G', which extends the whole width of the frame A, and has a metal plate, $g$, inserted in the rear part of its bottom, said plate being perforated with holes, and having a bar, H, directly over it, the lower edge of which is notched, as shown clearly in Fig. 3. This bar H is vibrated directly over the plate $g$, and it is operated by means of a lever, I, which is pivoted to the rear of the seed-box G' at its inner side, and has its upper end fitted loosely in a lever, H', the front edge of which is pivoted to the front edge of the seed-box, and has its rear end connected by a rod, I', to a crank, J, at the upper end of a shaft, K, the bearing of which is at the rear of frame A.

The shaft K has a pulley, L, at its lower end, around which and a pulley at one end of the roller D' a belt or chain, $h$, passes. By this means it will be seen that as the machine is drawn along the notched bar H will be vibrated over the perforated plate $g$ and the seed in the box G' distributed evenly upon the ground, said bar H preventing the seed from clogging or arching over in the seed-box.

This device will answer admirably well for sowing grass-seed and other small seed which are to be scattered or sown broadcast. It renders the soil light and crushes or breaks the clods of earth.

Having thus described my invention, I claim as new and desire to secure by Letters Patent—

The combination of the rotary harrow and reciprocating seed-distributing device, when used in connection with a roller or rollers and operated therefrom in the manner substantially as herein shown and described.

W. W. WILEY.

Witnesses:
JAMES H. CAMPBELL,
MAHLON MARTIN.